United States Patent
Kwon et al.

(10) Patent No.: US 10,415,300 B2
(45) Date of Patent: Sep. 17, 2019

(54) LOW-EMISSIVITY COATING AND FUNCTIONAL CONSTRUCTION MATERIAL FOR WINDOW/DOOR COMPRISING LOW-EMISSIVITY COATING

(71) Applicant: LG HAUSYS, LTD., Seoul (KR)

(72) Inventors: Dae-Hoon Kwon, Anyang-si (KR); Youn-Ki Jun, Gwacheon-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/327,266

(22) PCT Filed: Jul. 24, 2015

(86) PCT No.: PCT/KR2015/007701
§ 371 (c)(1),
(2) Date: Jan. 18, 2017

(87) PCT Pub. No.: WO2016/017999
PCT Pub. Date: Feb. 4, 2016

(65) Prior Publication Data
US 2017/0159349 A1    Jun. 8, 2017

(30) Foreign Application Priority Data
Jul. 30, 2014   (KR) .......................... 10-2014-0097552

(51) Int. Cl.
*G02B 5/28* (2006.01)
*G02B 5/20* (2006.01)
(Continued)

(52) U.S. Cl.
CPC .............. *E06B 3/307* (2013.01); *C03C 17/36* (2013.01); *C03C 17/366* (2013.01);
(Continued)

(58) Field of Classification Search
CPC . G02B 1/00; G02B 1/005; G02B 1/10; G02B 1/105; G02B 1/11; G02B 1/111;
(Continued)

(56) References Cited

U.S. PATENT DOCUMENTS 6,495,251 B1 * 12/2002 Arbab ................. C03C 17/3435
                                                         428/212
6,589,658 B1 * 7/2003 Stachowiak ............ C03C 17/36
                                                         428/426
(Continued)

FOREIGN PATENT DOCUMENTS

CN        1100812 A       3/1995
CN      101078780 A      11/2007
(Continued)

OTHER PUBLICATIONS

International Search Report dated Oct. 12, 2015 corresponding to International Application PCT/KR2015/007701.
(Continued)

*Primary Examiner* — Thong Q Nguyen
(74) *Attorney, Agent, or Firm* — Hauptman Ham, LLP

(57) ABSTRACT

Provided is a low-emissivity coating comprising successively: a first dielectric layer comprising a first metal oxide; a low-emissivity layer; and a second dielectric layer having first and second layers stacked on each other, the first layer comprising a second metal oxide, and the second layer comprising a silicon aluminum nitride, wherein each of the first and second metal oxides has a refractive index ranging from about 2.2 to about 2.6 with regard to a wavelength of about 550 nm.

8 Claims, 2 Drawing Sheets

(51) Int. Cl.
*E06B 3/30* (2006.01)
*E06B 5/00* (2006.01)
*E04C 1/42* (2006.01)
*E04C 2/54* (2006.01)
*E06B 9/24* (2006.01)
*G02B 1/10* (2015.01)
*C03C 17/36* (2006.01)
*E04B 2/02* (2006.01)

(52) U.S. Cl.
CPC ............ *C03C 17/3644* (2013.01); *E04C 1/42* (2013.01); *E04C 2/54* (2013.01); *E06B 5/00* (2013.01); *E06B 9/24* (2013.01); *G02B 1/10* (2013.01); *G02B 5/282* (2013.01); *E04B 2002/0286* (2013.01)

(58) Field of Classification Search
CPC .......... G02B 1/115; G02B 1/116; G02B 5/00; G02B 5/20; G02B 5/282; E04C 1/42; E04C 2/54; E06B 3/307; E06B 5/00; E06B 9/24
See application file for complete search history.

(56) References Cited

U.S. PATENT DOCUMENTS

| | | | | |
|---|---|---|---|---|
| 7,462,398 | B2* | 12/2008 | Lemmer | C03C 17/36 428/426 |
| 9,688,572 | B2* | 6/2017 | Kim | C09D 1/00 |
| 2004/0137235 | A1* | 7/2004 | Paul | C03C 17/36 428/432 |
| 2004/0190141 | A1* | 9/2004 | Wolfe | G02B 5/0808 359/572 |
| 2006/0134436 | A1* | 6/2006 | Maschwitz | C03C 17/36 428/426 |
| 2006/0141272 | A1* | 6/2006 | Wolfe | G02B 5/0858 428/457 |

FOREIGN PATENT DOCUMENTS

| | | |
|---|---|---|
| CN | 101925552 A | 12/2010 |
| CN | 102265190 A | 11/2011 |
| CN | 103492173 A | 1/2014 |
| KR | 970000383 B1 | 1/1997 |
| KR | 10-2006-0077827 A | 7/2006 |
| KR | 10-2010-0098199 A | 9/2010 |
| KR | 10-2012-0029530 A | 3/2012 |
| KR | 10-1302259 B1 | 9/2013 |
| KR | 10-2013-0142370 A | 12/2013 |
| WO | 2013191345 A1 | 12/2013 |

OTHER PUBLICATIONS

Korean Office Action dated Jun. 21, 2018, in connection with the Korean Patent Application No. 10-2014-0097552.

Chinese Office Action dated Mar. 26, 2018, in connection with the Chinese Patent Application No. 201580039650.X.

* cited by examiner

LOW-EMISSIVITY COATING AND FUNCTIONAL CONSTRUCTION MATERIAL FOR WINDOW/DOOR COMPRISING LOW-EMISSIVITY COATING

CROSS REFERENCE TO RELATED APPLICATION

This application claims the priority of Korean Patent Application No. 10-2014-0097552, filed on Jul. 30, 2014, in the KIPO (Korean Intellectual Property Office). Further, this application is the National Phase Application of International Application No. PCT/KR2015/007701, filed Jul. 24, 2015, which designates the United States and was published in Korean. Both of the priority documents are hereby incorporated by reference in their entireties.

TECHNICAL FIELD

The present invention relates to a low-emissivity coating and a functional construction material for window/door including the low-emissivity coating.

BACKGROUND ART

A low-emissivity glass refers to a glass in which a low-emissivity layer containing a highly reflective metal in an infrared region such as silver (Ag) is deposited as a thin film. The low-emissivity glass is a functional material having an energy saving effect of a building structure by reflecting radiant rays in the infrared region to block outdoor solar radiant heat in summer and to preserve indoor heating radiant heat.

Silver (Ag) used for the low-emissivity layer is oxidized when being exposed in the air, such that dielectric layers are deposited as oxidation prevention layers on an upper part and a lower part of the low-emissivity layer.

In general, the low-emissivity layer should be formed at a specific thickness or more in order to decrease emissivity in the low-emissivity coating, and accordingly, there is a problem in that visible light transmittance is decreased, which reduces a lighting property.

SUMMARY

It is an aspect of the present invention to provide a low-emissivity coating capable of implementing excellent visible light transmittance and neutral color.

It is another aspect of the present invention to provide a functional construction material for window/door including the low-emissivity coating.

Technical Solution

In accordance with one aspect of the present invention, a low-emissivity coating successively includes: a first dielectric layer including a first metal oxide; a low-emissivity layer; and a second dielectric layer on which a first layer and a second layer are stacked, the first layer including a second metal oxide, and the second layer including a silicon aluminum nitride, wherein each of the first metal oxide and the second metal oxide has a refractive index in the range of about 2.2 to about 2.6 with regard to a wavelength of about 550 nm.

The first metal oxide and the second metal oxide may include at least one selected from the group consisting of titanium oxide, zirconium oxide, niobium oxide, and a combination thereof.

A thickness ratio of the first layer included in the second dielectric layer to the first dielectric layer may be about 1:0.4 to about 1:6.

A thickness ratio of the first layer included in the second dielectric layer to the second layer may be about 1:0.2 to about 1:4.

A thickness of the first layer included in the second dielectric layer may be about 5 nm to about 25 nm.

The low-emissivity coating may further include: deposition auxiliary layers stacked while contacting at least both surfaces of the low-emissivity layer.

The deposition auxiliary layer may include zinc aluminum oxide.

A thickness of the deposition auxiliary layer may be about 1 nm to about 20 nm.

At least one element selected from the group consisting of bismuth (Bi), boron (B), aluminum (Al), silicon (Si), magnesium (Mg), antimony (Sb), beryllium (Be), and a combination thereof may be doped on the second layer.

The low-emissivity layer may include at least one selected from the group consisting of silver (Ag), gold (Au), copper (Cu), aluminum (Al), platinum (Pt), and a combination thereof.

A thickness of the low-emissivity layer may be about 5 nm to about 25 nm.

In accordance with another aspect of the present invention, a functional construction material for window/door includes: a transparent substrate; and the low-emissivity coating as described above coated on at least one surface of the transparent substrate.

The transparent substrate may be a glass or a transparent plastic substrate having a visible light transmittance of about 80% to about 100%.

A visible light transmittance of the functional construction material for window/door may be about 88% to about 100% of the visible light transmittance of the transparent substrate.

A lightness index L* may be about 80 to about 90, a chromaticity index a* may be about −4.00 to about 4.00, and a chromaticity index b* may be about −4.00 to about 4.00, the lightness index L*, the chromaticity index a*, and the chromaticity index b* measured with regard to a transmitted light under a D65 light source according to conditions of JIS K7361-1 of the functional construction material for window/door.

Advantageous Effects

The low-emissivity coating is capable of implementing excellent visible light transmittance and neutral color.

BEST MODE

Figure 1:
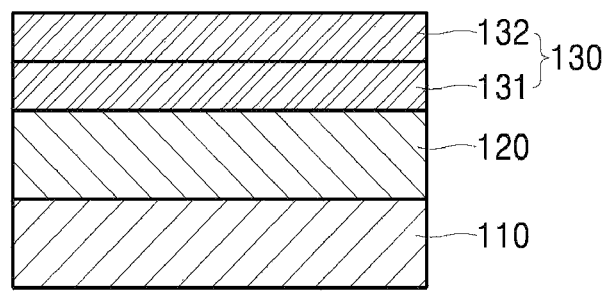
FIG. 1 is a cross-sectional view schematically illustrating a low-emissivity coating according to an exemplary embodiment of the present invention.

Hereinafter, exemplary embodiments of the present invention will be described in detail with reference to the accompanying drawings so that those skilled in the art may easily practice the present invention. The present invention may be implemented in various different ways and is not limited to the exemplary embodiments provided in the present description.

The description of parts deviating from the subject matter of the present invention will be omitted in order to clearly describe the present invention. Like reference numerals designate like elements throughout the specification.

In the drawings, thicknesses of various layers and regions are exaggerated for clarity. In the drawings, thicknesses of partial layers and regions are exaggerated for convenience of explanation.

Hereinafter, formation of any configuration "on (or below)" of a substrate means that any configuration is formed while contacting an upper surface (or a lower surface) of the substrate, and should not be intended to exclude other configurations between the substrate and any configuration formed on (or below) the substrate.

In an exemplary embodiment of the present invention, there is provided a low-emissivity coating successively including: a first dielectric layer including a first metal oxide; a low-emissivity layer; and a second dielectric layer on which a first layer and a second layer are stacked, the first layer including a second metal oxide, and the second layer including a silicon aluminum nitride, wherein each of the first metal oxide and the second metal oxide has a refractive index in the range of about 2.2 to about 2.6 with regard to a wavelength of about 550 nm.

Generally, the low-emissivity coating may be formed in a multilayer thin film structure on the basis of a low-emissivity layer selectively reflecting far-infrared ray among solar radiant rays, and reduces emissivity to provide excellent insulation performance by a low emissivity, i.e., a low-e effect, on the low-emissivity coating. The low-emissivity coating is a functional material having an energy saving effect of buildings by reflecting outdoor solar radiant heat in summer and preserving indoor heating radiant heat in winter to minimize heat transfer between indoor and outdoor, for example, when being applied to a coating film of a glass window.

'Emissivity' may represent a relative value indicating a degree at which an object transmits heat by a radiation action. That is, the emissivity in the present specification refers to an absorption degree of infrared ray energy included in an infrared wavelength region, specifically, means a ratio of infrared ray energy to be absorbed with regard to infrared ray energy to be applied when far-infrared ray corresponding to a wavelength region of about 5 μm to about 50 μm to have strong heat action is applied.

According to Kirchhoff's theory, infrared energy absorbed by a material is the same as infrared energy emitted by the material, such that an absorption rate of the material is the same as an emission rate of the material.

In addition, since infrared energy that is not absorbed by the material is reflected on the surface of the material, as reflectance to infrared energy of the material is increased, emissivity is decreased. Upon expressing the above-description as a numerical relationship, an equation (emissivity=1− infrared reflectance) is provided.

The emissivity may be measured by various methods generally known in the art, for example, may be measured by equipments such as Fourier transform infrared spectroscopy (FT-IR), etc., according to KSL2514 standard.

The absorption rate with regard to far-infrared ray having strong thermal action as described above, i.e., emissivity, of any objects, for example, low-emissivity glass, etc., may represent a significantly important meaning in measuring insulation performance.

In general, the low-emissivity layer should be formed at a specific thickness or more in order to decrease emissivity in the low-emissivity coating, and accordingly, there is a problem in that visible light transmittance is decreased, which reduces lighting property.

Accordingly, the low-emissivity coating according to an exemplary embodiment of the present invention has advantages in that the low-emissivity layer may be formed at a specific thickness or more as it is to thereby maintain a reduced low-emissivity, and high-refractive metal oxide may be included in the first dielectric layer and the second dielectric layer to increase the visible light transmittance, thereby implementing excellent lighting property and neutral color. Further, the second dielectric layer is formed in a structure in which the first layer and the second layer are stacked, the first layer including the high-refractive metal oxide, and the second layer including the silicon aluminum nitride, such that as described above, abrasion resistance, chemical resistance, and moisture resistance may be improved to maintain excellent durability for a long period of time while implementing high visible light transmittance.

FIG. 1 is a cross-sectional view schematically illustrating a low-emissivity coating 100 according to an exemplary embodiment of the present invention. The low-emissivity coating 100 successively includes: a first dielectric layer 110 including a first metal oxide; a low-emissivity layer 120; and a second dielectric layer 130 on which a first layer 131 and a second layer 132 are stacked, the first layer including a second metal oxide, and the second layer including a silicon aluminum nitride, wherein each of the first metal oxide and the second metal oxide has a refractive index in the range of about 2.2 to about 2.6 with regard to a wavelength of about 550 nm.

As described above, the first dielectric layer 110 includes the first metal oxide having a high level of refractive index within the above-described range and the second dielectric layer 130 includes the second metal oxide having a high level of refractive index within the above-described range, such that lights incident to the low-emissivity coating 100 proceed from a low-refractive thin film to a high-refractive thin film having higher refractive index, which may increase phase difference of lights reflected on each interface. Accordingly, a degree that destructive interference occurs among lights reflected on each interface may be more increased, such that the visible light transmittance of the low-emissivity coating 100 may be effectively increased.

Therefore, the low-emissivity coating 100 is used, for example, as a coating film on a transparent substrate such as a glass, etc., to be usable as an energy-saving functional construction material for window/door capable of maintaining a low-emissivity in the infrared region to provide an excellent insulation effect and having high transmission property in the visible light region to implement excellent lighting property and neutral color.

Further, the second dielectric layer 130 may include, specifically, the second metal oxide having a high level of refractive index in the first layer 131, and include the silicon aluminum nitride having high abrasion resistance in the second layer 132, thereby simultaneously implementing excellent visible light transmittance and excellent durability for a long period of time.

The first metal oxide and the second metal oxide may include, for example, at least one selected from the group consisting of titanium oxide, zirconium oxide, niobium oxide, and a combination thereof, and specifically, may include titanium oxide. The titanium oxide has a band gap of about 3.2 eV to about 3.3 eV to have a large UV absorption rate having a wavelength of about 388 nm to about 370 nm; on the contrary, has a small visible light absorption rate having a wavelength of about 400 nm to about 700 nm, such that the visible light transmittance of the low-emissivity coating 100 may be increased, and abrasion resistance, chemical resistance, etc., may be high even among materials having a high refractive index, thereby simultaneously implementing excellent durability.

A thickness ratio of the first layer 131 included in the second dielectric layer 130 to the first dielectric layer 110 may be about 1:0.4 to about 1:6. Within the above-described range of thickness ratio, the visible light transmittance of the low-emissivity coating 100 may be sufficiently increased, and as described below, the thickness of the second layer 132 including the silicon aluminum nitride having high abrasion resistance, chemical resistance, and moisture resistance, in the second dielectric layer 130 may be appropriately formed, such that excellent abrasion resistance, chemical resistance, and moisture resistance may be implemented.

A thickness ratio of the first layer 131 included in the second dielectric layer 130 to the second layer 132 may be about 1:0.2 to about 1:4. Within the above-described range of thickness ratio, the visible light transmittance of the low-emissivity coating 100 and abrasion resistance, chemical resistance, and moisture resistance may be appropriately controlled, such that excellent durability for a long period of time may be implemented while simultaneously implementing excellent lighting property and neutral color.

A thickness of the first layer 131 included in the second dielectric layer 130 may be about 5 nm to about 25 nm. Within the above-described range of thickness, the visible light transmittance of the low-emissivity coating 100 may be appropriately increased without excessively increasing a total thickness of the low-emissivity coating 100.

Accordingly, a thickness of the first electric layer 110 may be about 10 nm to about 30 nm. Within the above-described range of thickness, the visible light transmittance of the low-emissivity coating 100 may be appropriately increased to implement excellent lighting property and neutral color, without excessively increasing a total thickness of the low-emissivity coating 100.

In addition, a thickness of the second layer 132 may be about 5 nm to about 20 nm. Within the above-described range of thickness, sufficient abrasion resistance, chemical resistance, and moisture resistance may be provided to implement excellent durability for a long period of time, without excessively increasing the thickness of the low-emissivity coating 100.

At least one element selected from the group consisting of bismuth (Bi), boron (B), aluminum (Al), silicon (Si), magnesium (Mg), antimony (Sb), beryllium (Be), and a combination thereof, may be doped with the silicon aluminum nitride of the second layer 132 in the second dielectric layer 130, and accordingly, durability may be more improved.

The low-emissivity layer 120 is a layer made of an electrically conductive material having a low emissivity, for example, a metal, and has a low sheet resistance, and accordingly, a low emissivity. For example, the low-emissivity layer 120 may have an emissivity of about 0.01 to about 0.3, specifically, about 0.01 to about 0.2, more specifically, about 0.01 to about 0.1, and still more specifically, about 0.01 to about 0.08.

The low-emissivity layer 120 having the above-described range of emissivity may implement an excellent insulation effect while simultaneously implementing excellent lighting property and neutral color by appropriately controlling the visible light transmittance and the infrared emissivity. In the low-emissivity layer 120 having the above-described range of emissivity, a sheet resistance of a material forming the thin film may be, for example, about 0.78 Ω/sq to about 6.42 Ω/sq, but the sheet resistance thereof is not limited thereto.

The low-emissivity layer 120 functions to selectively transmit and reflect a solar radiant ray, and specifically, has a low emissivity since reflectance for radiant ray in the infrared region is high. The low-emissivity layer 120 may include at least one selected from the group consisting of silver (Ag), gold (Au), copper (Cu), aluminum (Al), platinum (Pt), and a combination thereof, but the present invention is not limited thereto, and any metal known in the art that is capable of implementing low-emissivity performance may be used without limitation.

In an exemplary embodiment of the present invention, the low-emissivity layer 120 may be a layer made of silver (Ag), and as a result, the low-emissivity coating 100 may implement high electrical conductivity, a low absorption rate in the visible light region, durability, etc.

For example, the low-emissivity layer 120 may have a thickness of about 5 nm to about 25 nm. Within the above-described range of thickness, sufficiently low infrared emissivity may be maintained without excessively increasing the visible light transmittance, thereby implementing excellent insulation property.

Figure 2:
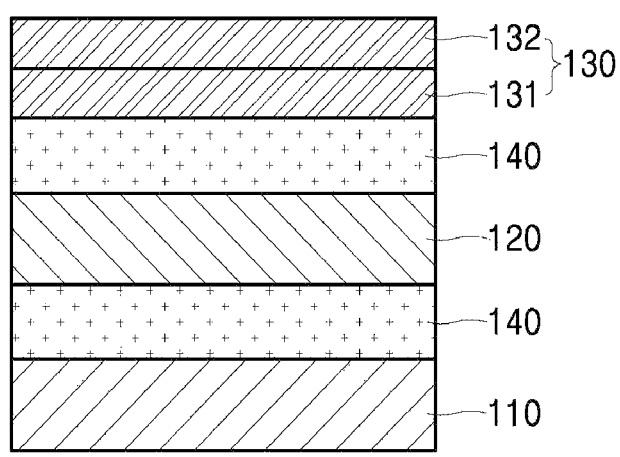
FIG. 2 is a cross-sectional view schematically illustrating the low-emissivity coating further including deposition auxiliary layers.

The low-emissivity coating may further include: deposition auxiliary layers stacked while contacting at least both surfaces of the low-emissivity layer 120, and accordingly, deposition of the low-emissivity layer 120, etc., may be more uniformly performed, and simultaneously, adhesion force between each layer may be improved. FIG. 2 is a cross-sectional view schematically illustrating a low-emissivity coating 100' further including the deposition auxiliary layers 140.

The first dielectric layer 110 has a high surface roughness, such that when the low-emissivity layer 120 is deposited on an upper surface of the first dielectric layer, the deposition is difficult to be uniformly performed. Since adhesion property between the low-emissivity layer 120 and the first dielectric layer 110, and adhesion property between the low-emissivity layer 120 and the second dielectric layer 130 are not high, a gap may occur on stacked surfaces thereof over time. Regarding this, by further including the deposition auxiliary layers 140 as described above, when the low-emissivity layer 120 is formed, the deposition of materials such as silver (Ag), gold (Au), copper (Cu), etc., may be evenly and uniformly performed, such that electron mobility of the low-emissivity layer may be increased, which more reduces emissivity, and at the same time, adhesion force between each layer may be improved, such that the layers may be firmly stacked, thereby implementing excellent durability for a long period of time.

The deposition auxiliary layer 140 may include zinc aluminum oxide ($ZnAlO_x$). The zinc aluminum oxide has a property in which a surface formed by deposition is smoothly formed when the deposition is performed by sputtering, and accordingly, the material deposited on the smooth surface in which zinc aluminum oxide is deposited may also be evenly and uniformly deposited. The low-emissivity layer 120 may be evenly and uniformly formed to improve adhesion force with both of the first dielectric layer 110 and the second dielectric layer 130, such that excellent emissivity performance and excellent durability may be simultaneously implemented.

For example, the deposition auxiliary layer 140 may have a thickness of about 1 nm to about 20 nm, and specifically, about 5 nm to about 20 nm. Within the above-described range of thickness, the deposition of the materials such as silver (Ag), gold (Au), copper (Cu), etc., may be sufficiently and uniformly performed at the time of forming the low-emissivity layer 120 even without excessively increasing a thickness of the low-emissivity coating 100', such that emissivity may be reduced, and simultaneously, adhesion force between each of the above-described layers may be improved. When the thickness of the deposition auxiliary layer 140 is formed to be about 5 nm to about 20 nm, deposition of the low-emissivity layer 120 is more uniformly performed, such that adhesion force between each of the above-described layers may be more improved while implementing low emissivity, thereby increasing uniformity to more improve durability of the low-emissivity coating 100'.

In addition, a top protective layer may be included on the top of the second dielectric layer 130 of the low-emissivity coating 100'. The top protective layer may include a metal oxide containing at least one element selected from Al, B, Ti, Nb, Sn and Mo, but the present invention is not limited thereto.

In another exemplary embodiment of the present invention, there is provided a functional construction material for window/door including: a transparent substrate; and the low-emissivity coating as described above coated on at least one surface of the transparent substrate.

Figure 3:
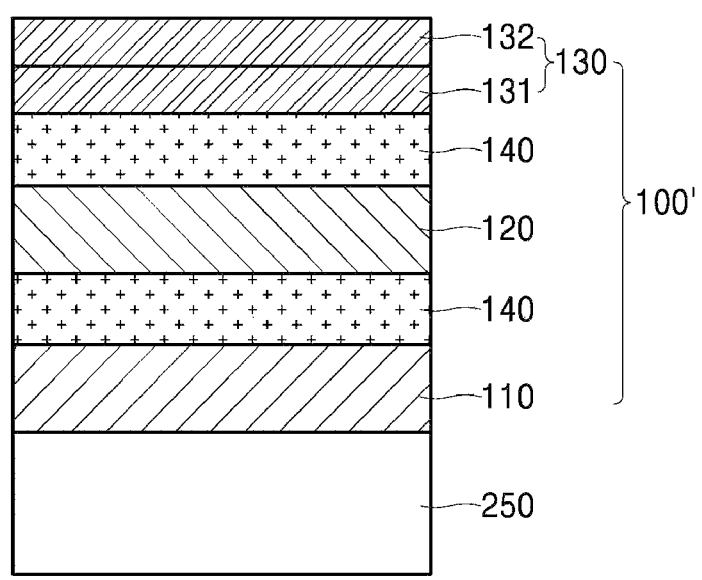
FIG. 3 is a cross-sectional view schematically illustrating a functional construction material for window/door according to another exemplary embodiment of the present invention.

FIG. 3 is a cross-sectional view of the functional construction material for window/door 200, which may have a structure in which the low-emissivity coating(s) is coated on the at least one surface, for example, one surface or both surfaces, of the substrate 250. Specifically, the functional construction material for window/door 200 may have a structure in which the low-emissivity coating 100 is coated on the at least one surface of the substrate 250, the low-emissivity coating 100 including: the first dielectric layer 110, the low-emissivity layer 120, and the second dielectric layer 130 that are successively stacked, and as illustrated in FIG. 3, may have a structure in which the low-emissivity coating 100 further including the deposition auxiliary layers 140 stacked while contacting both surfaces of the low-emissivity layer 120 is coated on the at least one surface of the substrate 250.

The low-emissivity coating 100', the first dielectric layer 110, the low-emissivity layer 120, and the second dielectric layer 130 are the same as described above in an exemplary embodiment of the present invention.

The substrate 250 may be a transparent substrate 250 having a high visible light transmittance. For example, the transparent substrate 250 may be a glass or a transparent plastic substrate having about 80% to about 100% of visible light transmittance with regard to the thickness of about 1 mm to about 15 mm.

The substrate 250 is usable without limitation, but for example, a glass used for construction. For example, a thickness of the substrate may be about 2 mm to about 12 mm, and may vary depending on use purposes and functions, but the thickness of the substrate is not limited thereto.

The visible light transmittance of the functional construction material for window/door measured with regard to the thickness of about 1 mm to about 15 mm may be about 88% to about 100% of the visible light transmittance of the transparent substrate 250.

The low-emissivity coating 100' may effectively inhibit or prevent a reduction in visible light transmittance of the transparent substrate 250, such that the functional construction material for window/door may have visible light transmittance corresponding to the above-described range of percentage on the basis of the visible light transmittance of the transparent substrate 250 to have a high level of visible light transmittance.

Accordingly, the low-emissivity coating 100' may be applied as a coating film coated on the transparent substrate 250 to maintain a low emissivity in the infrared region and at the same time, to have high transmission property in the visible light region, such that the functional construction material for window/door may have excellent lighting property and neutral color while implementing an excellent insulation effect.

A lightness index L* may be about 80 to about 90, a chromaticity index a* may be about −4.00 to about 4.00, and a chromaticity index b* may be about −4.00 to about 4.00, the lightness index L*, the chromaticity index a*, and the chromaticity index b* measured with regard to a transmitted light under a D65 light source according to conditions of JIS K7361-1 of the functional construction material for window/door.

Within the above-described ranges of lightness index and chromaticity indices, the neutral color may be implemented to be an excellent level, thereby creating more pleasant indoor atmosphere.

Hereinafter, Examples and Comparative Examples of the present invention are described. However, the following Examples are only provided as one exemplary embodiment of the present invention, and the present invention is not limited to the following Examples.

EXAMPLE

Example 1

A low-emissivity coating having a multilayer structure and coated on a transparent glass substrate was manufactured as described below by using a Magnetron sputtering deposition device (Selcos Cetus-S).

A first dielectric layer having a thickness of 30 nm was formed on a transparent glass substrate having a thickness of 6 mm by depositing titanium oxide under argon/oxygen (50 vol % of argon, 50 vol % of oxygen) atmosphere, the titanium oxide having a refractive index of 2.4 at a wavelength of 550 nm. Subsequently, a low-emissivity layer having a thickness of 7 nm was formed on an upper surface of the first dielectric layer by depositing Ag under 100% of argon atmosphere. In addition, subsequently, as a second dielectric layer, a first layer having a thickness of 10 nm was formed on the upper surface of the low-emissivity layer by depositing titanium oxide under argon/oxygen (50 vol % of argon, 50 vol % of oxygen) atmosphere, the titanium oxide having a refractive index of 2.4 at a wavelength of 550 nm, and a second layer having a thickness of 20 nm was formed on an upper surface of the first layer by depositing silicon aluminum nitride under argon/nitrogen (70 vol % of argon, 30 vol % of nitrogen) atmosphere, thereby manufacturing a low-emissivity coating coated on the transparent glass substrate.

In the manufactured low-emissivity coating, a thickness ratio of the first layer to the first dielectric layer was 1:3, and a thickness ratio of the first layer to the second layer was 1:2.

Example 2 (Further Including Deposition Auxiliary Layers)

A first dielectric layer having a thickness of 30 nm was formed on a transparent glass substrate having a thickness of 6 mm by depositing titanium oxide under argon/nitrogen (80 vol % of argon, 20 vol % of nitrogen) atmosphere, the titanium oxide having a refractive index of 2.4 at a wavelength of 550 nm. Subsequently, a deposition auxiliary layer having a thickness of 10 nm was formed on an upper surface of the first dielectric layer by depositing zinc aluminum oxide under argon/oxygen (60 vol % of argon, 40 vol % of oxygen) atmosphere, and a low-emissivity layer having a thickness of 7 nm was formed on an upper surface of the deposition auxiliary layer by depositing Ag under 100% of argon atmosphere, and a deposition auxiliary layer having a thickness of 10 nm was formed on an upper surface of the low-emissivity layer by depositing zinc aluminum oxide under argon/oxygen (60 vol % of argon, 40 vol % of oxygen) atmosphere. Subsequently, as a second dielectric layer, a first layer having a thickness of 10 nm was formed on an upper surface of the deposition auxiliary layer by depositing titanium oxide under argon/oxygen (50 vol % of argon, 50 vol % of oxygen) atmosphere, the titanium oxide having a refractive index of 2.4 at a wavelength of 550 nm, and a second layer having a thickness of 20 nm was formed on an upper surface of the first layer by depositing silicon aluminum nitride under argon/nitrogen (70 vol % of argon, 30 vol % of nitrogen) atmosphere, thereby manufacturing a low-emissivity coating coated on the transparent glass substrate.

In the manufactured low-emissivity coating, a thickness ratio of the first layer to the first dielectric layer was 1:3, and a thickness ratio of the first layer to the second layer was 1:2.

Comparative Example 1 (the First Dielectric Layer was Formed of a Material Having a Low Refractive Index)

A low-emissivity coating coated on a transparent glass substrate was manufactured by the same method and the same conditions as Example 1 except for forming the first dielectric layer by depositing silicon aluminum oxide having a refractive index of 1.45 at a wavelength of 550 nm.

Comparative Example 2 (the First Layer was Formed of a Material Having a Low Refractive Index)

A low-emissivity coating coated on a transparent glass substrate was manufactured by the same method and the same conditions as Example 1 except for forming the first layer of the second dielectric layer by depositing silicon aluminum oxide having a refractive index of 1.45 at a wavelength of 550 nm.

Evaluation

Respective physical properties with regard to glasses coated with the low-emissivity coatings manufactured by Examples 1 and 2, and Comparative Examples 1 and 2 were evaluated according to the following methods, and were shown in Table 1 below.

(Visible Light Transmittance)

Measurement Method: A spectrophotometer (BYK-Gardner, Haze-gardner plus) was used for measurement.

(Lightness Index and Chromaticity Index)

Measurement Method: A spectrophotometer (Konica Minolta, CM-700d) was used under a D65 light source according to measurement conditions of JIS K7361-1.

TABLE 1

| | Visible Light Transmittance (%) | Lightness Index (L*) | Chromaticity Index (a*) | Chromaticity Index (b*) |
|---|---|---|---|---|
| Example 1 | 84.92 | 93.85 | −1.38 | 0.39 |
| Example 2 | 88.76 | 95.48 | −2.45 | 0.25 |
| Comparative Example 1 | 69.11 | 86.56 | 1.63 | 13.27 |
| Comparative Example 2 | 80.30 | 91.82 | −0.9 | 6.88 |

In the glasses coated with the low-emissivity coatings of Examples 1 and 2, the visible light transmittance was high as 84.92% or more, such that excellent lighting property could be implemented, and at the same time, all of lightness index and chromaticity indices (a*, b*) were low as 4 or less, such that neutral color could be implemented to be a more excellent level.

On the contrary, in Comparative Example 1, the visible light transmittance was remarkably low as 70% or less, such that lighting property was poor, and the chromaticity index (b*) was remarkably high, which could clearly predict difficulty in implementing an excellent level of neutral color. In addition, in Comparative Example 2, the visible light transmittance was normal, but the chromaticity index (b*) was high, which could clearly predict difficulty in implementing an excellent level of neutral color.

The invention claimed is:

1. A low-emissivity coating successively comprising:
    a first dielectric layer consisting of a first metal oxide;
    a low-emissivity layer directly on the first dielectric layer, wherein a thickness of the low-emissivity layer ranges from 5 nm to 7 nm; and
    a second dielectric layer directly on the low-emissivity layer, wherein the second dielectric layer comprises:
        a first layer directly on the low-emissivity layer, consisting of a second metal oxide, wherein a thickness of the first layer ranges from 10 nm to 25 nm; and
        a second layer directly on the first layer, consisting of a silicon aluminum nitride,
    wherein each of the first metal oxide and the second metal oxide independently has a refractive index ranging from 2.2 to 2.6 with regard to a wavelength of 550 nm,
    wherein the first metal oxide consists of titanium oxide, and the second metal oxide consists of titanium oxide,
    wherein a thickness ratio between the first layer and the first dielectric layer ranges from 1:3 to 1:6, and
    wherein a thickness ratio between the first layer and the second layer ranges from 1:2 to 1:4.

2. The low-emissivity coating of claim 1, wherein at least one element selected from the group consisting of bismuth (Bi), boron (B), aluminum (Al), silicon (Si), magnesium (Mg), antimony (Sb), beryllium (Be), and a combination thereof is doped on the second layer.

3. The low-emissivity coating of claim 1, wherein the low-emissivity layer includes at least one selected from the group consisting of silver (Ag), gold (Au), copper (Cu), aluminum (Al), and platinum (Pt).

4. A functional construction material for window/door comprising:
    a transparent substrate; and
    the low-emissivity coating of claim 1 coated on at least one surface of the transparent substrate.

5. The functional construction material for window/door of claim 4, wherein the transparent substrate is a glass or a transparent plastic substrate having a visible light transmittance of 80% to 100%.

6. The functional construction material for window/door of claim 5, wherein a visible light transmittance of the functional construction material for window/door is 88% to 100% of the visible light transmittance of the transparent substrate.

7. The functional construction material for window/door of claim 4, wherein a lightness index L* is 80 to 90, a chromaticity index a* is −4.00 to 4.00, and a chromaticity index b* is −4.00 to 4.00 which the lightness index L*, the chromaticity index a*, and the chromaticity index b* are measured with regard to a transmitted light under a D65 light source according to conditions of JIS K7361-1 of the functional construction material for window/door.

8. The low-emissivity coating of claim 1, wherein the low-emissivity layer comprises at least one selected from the group consisting of silver (Ag), gold (Au), copper (Cu), aluminum (Al), and platinum (Pt).

* * * * *